(12) United States Patent
Ratcliff

(10) Patent No.: US 7,322,431 B2
(45) Date of Patent: Jan. 29, 2008

(54) ADVANCED ULTRASONIC PROCESSOR

(75) Inventor: Henry Kevin Ratcliff, Liverpool (GB)

(73) Assignee: Ultrasonic Processors Limited (GB)

( * ) Notice: Subject to any disclaimer, the term of this patent is extended or adjusted under 35 U.S.C. 154(b) by 325 days.

(21) Appl. No.: 10/528,869

(22) PCT Filed: Sep. 26, 2003

(86) PCT No.: PCT/GB03/04185

§ 371 (c)(1),
(2), (4) Date: Mar. 24, 2005

(87) PCT Pub. No.: WO2004/028663

PCT Pub. Date: Apr. 8, 2004

(65) Prior Publication Data

US 2005/0271559 A1    Dec. 8, 2005

(30) Foreign Application Priority Data

Sep. 27, 2002  (GB) ................................ 0222421.0

(51) Int. Cl.
*E21B 21/06* (2006.01)
*B01D 21/28* (2006.01)

(52) U.S. Cl. .................. 175/206; 166/177.1; 210/748; 175/207

(58) Field of Classification Search ............. 166/177.1; 210/748; 175/206, 207
See application file for complete search history.

(56) References Cited

U.S. PATENT DOCUMENTS

| | | | | |
|---|---|---|---|---|
| 3,239,998 A | * | 3/1966 | Carter et al. ................... | 96/175 |
| 3,779,070 A | * | 12/1973 | Cushman et al. ........... | 73/865.5 |
| 3,904,392 A | * | 9/1975 | VanIngen et al. ............... | 95/30 |
| 4,205,966 A | | 6/1980 | Horikawa | |
| 4,728,368 A | * | 3/1988 | Pedziwiatr ...................... | 134/1 |
| 5,059,331 A | * | 10/1991 | Goyal ......................... | 210/748 |
| 5,164,094 A | | 11/1992 | Stuckart | |
| 5,225,089 A | | 7/1993 | Benes et al. | |
| 5,919,376 A | * | 7/1999 | Carman ....................... | 210/785 |
| 6,055,859 A | * | 5/2000 | Kozuka et al. ................ | 73/570 |
| 6,079,508 A | | 6/2000 | Caza | |
| 2003/0127535 A1 | * | 7/2003 | Adiga et al. .............. | 239/102.1 |
| 2005/0023219 A1 | * | 2/2005 | Kirker et al. ............... | 210/636 |
| 2006/0026906 A1 | * | 2/2006 | Stark et al. .................... | 51/307 |
| 2006/0034733 A1 | * | 2/2006 | Ferren et al. ................ | 422/101 |

FOREIGN PATENT DOCUMENTS

| | | |
|---|---|---|
| EP | 1 128 185 A2 | 8/2001 |
| GB | 508675 | 10/1937 |
| WO | WO 9312662 | 7/1993 |
| WO | WO 00/16888 | 3/2000 |
| WO | WO 00/54095 | 9/2000 |

* cited by examiner

*Primary Examiner*—Kenneth Thompson
(74) *Attorney, Agent, or Firm*—Landiorio & Teska

(57) ABSTRACT

An ultrasonic processor for continuous processing of material is disclosed comprising an enclosed processor chamber (12) having opposed end wall (18) and (16) and an input (40) and an output (42) so that material to be processed can be passed through the processor chamber. Ultrasound is applied to the chamber by a bank of ultrasonic converters (22,24) and the input and output are mutually displaced along a connecting wall (14) in a direction perpendicular to the processor wall to which the converter bank is coupled.

19 Claims, 4 Drawing Sheets

ADVANCED ULTRASONIC PROCESSOR

The present invention is concerned with improving performance and efficiency of continuous-throughput ultrasonic processors.

An important application of the invention concerns processing of drill cuttings in the oil industry, but the invention is also applicable in other fields including processing of mineral ores, land remediation and water treatment.

In drilling for oil, it is common practice to feed a drilling fluid, typically a mineral oil-based mud, to the cutting head. The cuttings resulting from the drilling have in the past been left to disperse on the seabed, but this is recognised as a potential environmental hazard.

It is known to collect this mixture and to process it. In the case of sub-sea drilling the cuttings and mud are together driven to the surface for collection. The cuttings-solids, which may contain toxic substances, are separated from the mud in one of several ways. Known methods include the use of screen shakers, ball mills, hydro cyclones and centrifuges. The mud, which is valuable is cleaned and reused. The cuttings themselves must be disposed of and this may be done by re-injection thereof into a disposal well. It is known to do this by first mixing the cuttings with seawater to form slurry, and then processing the cuttings to reduce their particle size to enable re-injection of the cuttings in the disposal well. Alternatively, the processed cuttings may be returned to shore for treatment.

It is known to utilize ultrasound in processing of the drill cuttings. The mixture collected from the well is exposed to ultrasound in a processor having a continuous throughput and the violent, highly localized pressure and temperature fluctuations created by cavitation associated with the ultrasonic waves de-agglomerate the mixture. Large particles are broken down and the mixture is then suitable for disposal.

A known ultrasonic processor for use in this context is disclosed in published European patent application EP841982 and its equivalent U.S. Pat. No. 6,079,508. It has an electronic generator or power supply and a tubular metal body which comprises the process chamber through which a continuous flow of material is passed. Ultrasonic vibrations are applied to the tube's exterior by a set of piezoelectric transducers bolted to the tube's curved outer surface, being seated upon respective saddles, whose inner faces are curved to match the tube and through which the ultrasonic waves are transmitted to the tube wall and through it to the material to be processed. Using this type of arrangement, it has proven necessary to connect several individual processors in series in processing drill cuttings. It is considered that this type of arrangement is inefficient in its use of the wave energy provided by the transducers.

On oilrigs, space and energy are both at a premium. An object of the present invention is to provide an especially energy efficient ultrasonic processor in converting high-frequency electrical energy from the generator or power supply into sonic energy in the process chamber with a substantial reduction in size of the processor footprint, as compared with the known ultrasonic processor.

Known ultrasonic processors use either a multiplicity of low intensity, non-resonant transducers bonded to the outer surface of a pipe with average power density less than 1 Wcm−2, or single, high power density (40-60 W cm−2) transducers (of the type used for ultrasonic welding) which may be welded to a pipe or used as a probe passed through the pipe wall and secured to the wall by means of a nodal flange. (Power density is here defined as electrical power input to a processing system or transducer divided by its radiating surface area). It is considered that both types of arrangement are inefficient. In the former case, the sonic energy may not penetrate more than 2 cm into the fast-flowing laden liquid. In the latter, high sonic power density focused on a small section of pipe may be expected to generate significant heat at that point. It may also be expected that a substantial proportion of the ultrasonic energy supplied by the transducer will be dissipated as heat as it flows along the pipe wall, more especially if the pipe is made of steel, which has poor acoustic properties. The probe, however, makes poor contact with the liquid flow, and cavitations in the liquid erode the tip degrading performance. And with the narrow pipe diameter required for effective ultrasonic action in a pipe and consequent high flow velocity, residence time of the mixture in the ultrasonic field will be short.

A further objective of the invention is to increase both acoustic efficiency and performance of the ultrasonic processor by an arrangement in which a closely-packed group of high-intensity transducers is bonded to a wall so as to develop a uniform, high power density ultrasonic field across its surface with negligible acoustic loss therein.

Accordingly the present invention provides an ultrasonic processor for the separation of a liquid mixture, the processor comprising an enclosed processor chamber having opposite end walls and input and output mixture carrying ports and communicating with the process chamber for the throughput of the mixture to be processed and a bank of ultrasonic converter units coupled to a wall of the processor chamber for transmitting ultrasonic waves to the mixture in the processor chamber characterised in that the input port is displaced from the output port along a connecting wall of the chamber in a direction substantially perpendicular to the chamber wall to which the bank of ultrasonic converter units are coupled, and the converter units in operation create an ultrasound stable standing wave pattern of multiple wavelengths between the input and output ports of the ultrasonic processor and along the length of the processor chamber.

Various advantages derive from the present invention.

The inventor has recognised that it is desirable in order to improve processor efficiency to achieve a stable standing ultrasonic wave pattern in the processor chamber and therefore maximum cavitation for a given energy input.

A stable standing wave inside the liquid is the best condition for cavitation, as the pressure variations in the medium are then at a maximum. Thus, minimum energy is required for cavitation or, vice versa, maximum intensity occurs for a given power input.

The inventor has further recognised that the tubular type of processor referred to above does not achieve a well defined standing wave pattern (corresponding to strong resonant behaviour). The tubular shape of the process chamber means that the laterally directed sound waves, if reflected at all from the processors internal walls, form a complicated pattern (and possible dead-spots where the reflected waves neutralise one another) and not a well-defined sonic standing wave.

Moreover, if a standing wave were formed in the known tubular type of processor, there would be a risk of some material failing to be processed at all. The cavitation, which is in large part responsible for processing, occurs in zones of rarefaction produced by the ultrasonic waves. The result of establishing a stable standing wave pattern would be to localize these zones. In the known tubular processor, wave propagation is essentially across the processor tube, so a stable standing wave would correspond to a situation in which some pattern of compression and rarefaction of the wave pattern existed, across the tube's width. Since the direction of the flow of material to be processed is along the length of the tube (i.e. essentially perpendicular to the direction of wave propagation) a proportion of the material passing along a zone of compression of the wave pattern, may not be subject to the necessary cavitation action.

In a processor constructed according to the present invention, material passes from the input in the sidewall at the lower end of the processor chamber, to the output in the sidewall at the upper end of the chamber. And, therefore, as the material moves along the direction of wave propagation it must pass through compression and rarefaction zones of any standing wave pattern and so must pass through regions of cavitation and thereby be processed in accordance with designated number of wave fronts and relative attenuation.

It can be expected that, in the simple case of a generally planar wave front, the wave front is generally parallel to the wall, which is acted on by the transducers and hence, the standing wave pattern is formed along a direction generally perpendicular to this wall.

In a particularly preferred embodiment of the present invention, the displacement of the input from the output along the sidewall is greater than the wavelength of ultrasound in the processor chamber at the driven frequency of the transducer.

In a further preferred embodiment of the present invention, the wall upon which the ultrasonic transducers are mounted is at least substantially flat.

The processor chamber has a second wall opposed to the wall on which the ultrasonic transducers are mounted across the interior of the processing chamber and at least substantially parallel thereto.

The arrangement is well suited for creating a sonic standing wave in material in the processing chamber. Waves induced by the transducer bank acting upon one of the walls are reflected from the opposed wall and, if the drive frequency of the transducer bank is appropriately chosen, the resulting travelling waves, propagating in opposite directions, constructively interfere to form a sonic standing wave. This principle is very well known to those skilled in the art.

It is especially preferred that the two walls are separated by a distance which is substantially an integral or half integral multiple of wavelength of ultrasound in the processor chamber at the driven frequency of the transducer. This condition maximizes constructive interference of the outgoing and reflected waves.

Power density in the mixture being processed may in a further preferred embodiment of the present invention, be increased by providing respective ultrasonic transducers acting on both of the opposed walls. To ensure constructive interference, provision could in such an embodiment be made for adjusting the phase of one bank of transducers relative to the other.

It is a preferred embodiment the transducers are formed into converter units comprised of piezoelectric modules coupled to identical rectangular wave-guides driven at the natural resonant frequency of the combination thereof.

The wave-guides may alternatively be of pyramidical shape.

The present invention makes it possible to use a processor chamber of large cross section as compared with the known tubular processors referred to above. Preferably, the cross section of the processor chamber (measured perpendicular to the flow direction through it) is substantially greater than 125 cm-2 (the cross section of a known tubular processor). In the currently preferred embodiment, the processor chamber has a cross section of substantially 1000 cm-2.

Clearly, for a given throughput of material being processed, the rate of flow is inversely proportional to the chamber's cross-section. A low rate of flow, achievable by means of the large cross section made possible by the present invention is beneficial in establishing efficient ultrasound action. In a processor having a relatively high flow velocities, such as the tubular processor, it is considered unlikely that a stable and powerful standing wave could be achieved. The slower flowing material in a large cross-section chamber enables stable standing waves to be established and maintained under load conditions, increases the interval of time the mixture being processed is resident in the processing chamber, and thus is more conducive to efficient ultrasonic action.

A specific embodiment of the present invention will now be described by way of example only, with reference to the accompanying drawings, in which.

Figure 1:
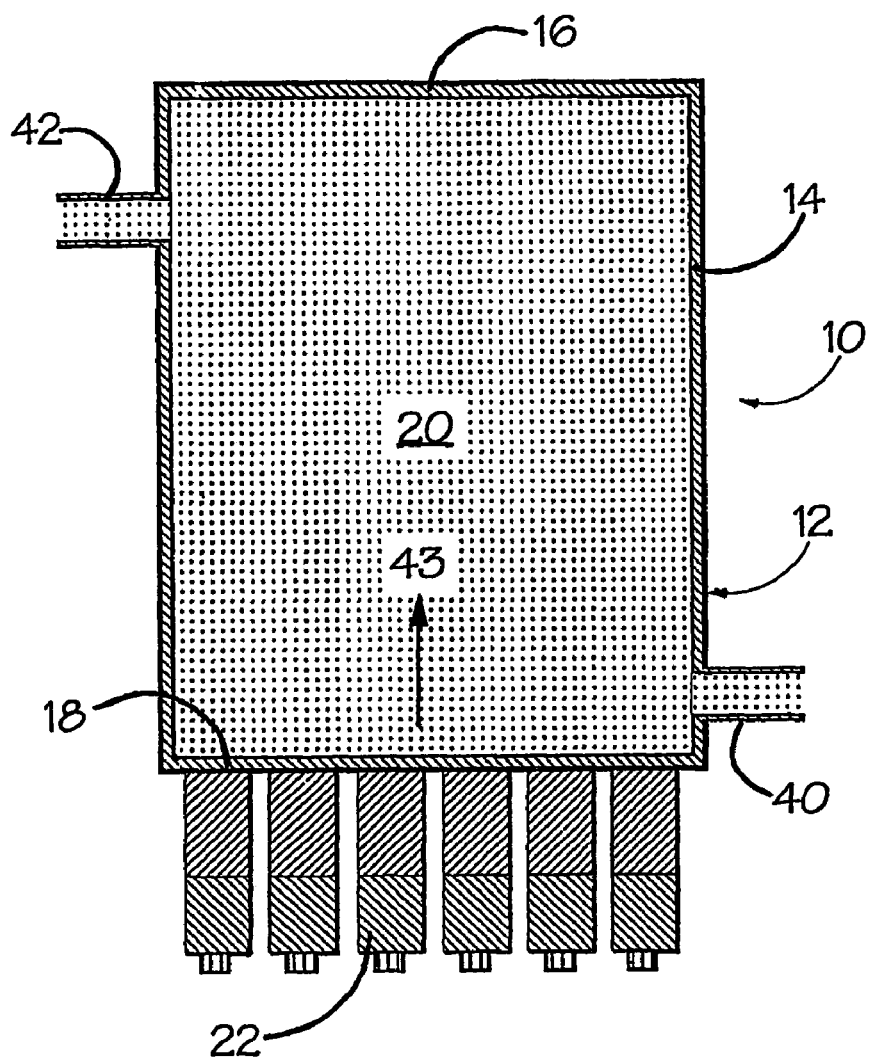
FIG. 1 is a vertical sectional view of an ultrasonic processor embodying the present invention.

The ultrasonic processor 10 illustrated in FIGS. 1 to 4 comprises a chamber 12 formed of metal and having a sidewall 14 which is in the illustrated embodiment circular in plan (although other shapes could be used) and which is closed at its upper and lower ends by end walls 16 and 18 respectively.

The end walls are opposed across the interior 20 of the chamber, and are in the illustrated embodiment flat and mutually parallel.

Figure 2:
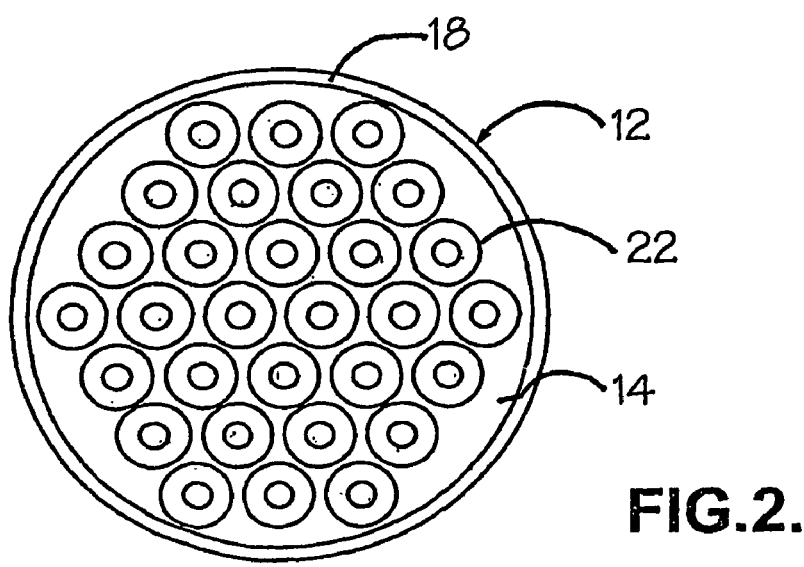
FIG. 2 is a view of the same processor from beneath.

Coupled to the lower wall 18 is a bank of ultrasonic transducers 22. The layout of individual transducers 22 is shown in FIG. 2, each being indicated by a circle for the sake of representational convenience, and positioned for minimum spacing one from the other.

Figure 7:
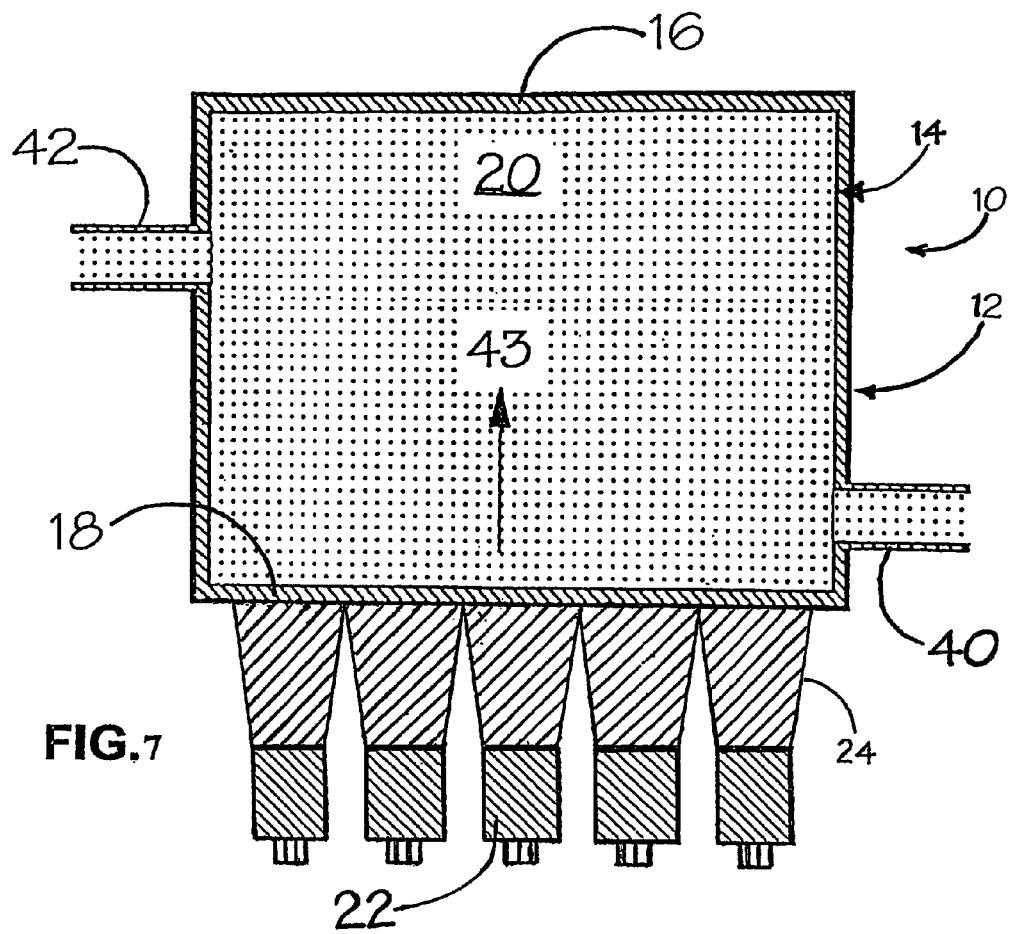
FIG. 7 is a side, sectional view of the transducer module assembled to an alternative wave-guide with outwardly sloped sides.
Figure 8:
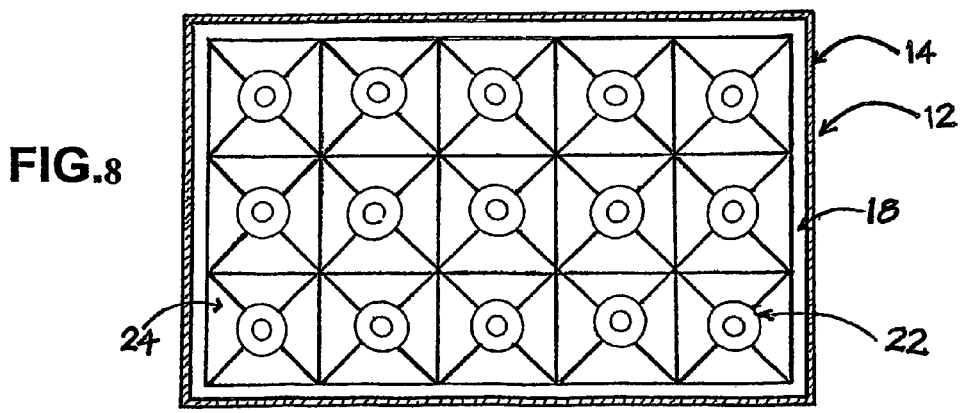
FIG. 8 shows the plan view of the transducer module with the alternative wave-guides.

In the current invention, wave-guides with rectangular edges within 5 mm or less of each other may be used. These may be alternatively of truncated, four-sided pyramidical shape as shown in FIGS. 7 and 8.

In the arrangement of FIG. 1, which is unconventional, a batch of identical ultrasonic transducers to be operated at mechanical resident frequency is bonded to a metal radiating plate in such a manner that the plate itself becomes a resonant element at the driven frequency of the electrical generator. The device, so constructed, would be a single entity, and perform as a very high-power transducer of large cross section.

The transducer assembly 18, thus described, will generally be acoustically decoupled from the chamber sidewall 14 and straightforwardly removable for replacement. Furthermore, the assembly may also find use in high power density ultrasonic applications not yet considered.

The wave-guide used in the invention, as with the horn in ultrasonic welding applications, can be of various shapes, invert of the horn. Wave-guides with square cross section at the lower end 18 may be designed to achieve the objective of uniform pre-determined power density at the wall surface to which the transducers are attached.

Such wave-guides may be designed as velocity transformers to step down the power density at the radiating face of a high-intensity transducer to a still high, but more usable value. e.g. the 200 W transducer module may have a power density of 16 w/cm−2.

and this may be stepped down to select a particular value in the power density range of, say, 2 W/cm−2 and 16/cm−2 simply by selecting the appropriate waveguide. (There may be an unexpressed market need for power intensities between high and low).

Figure 3:
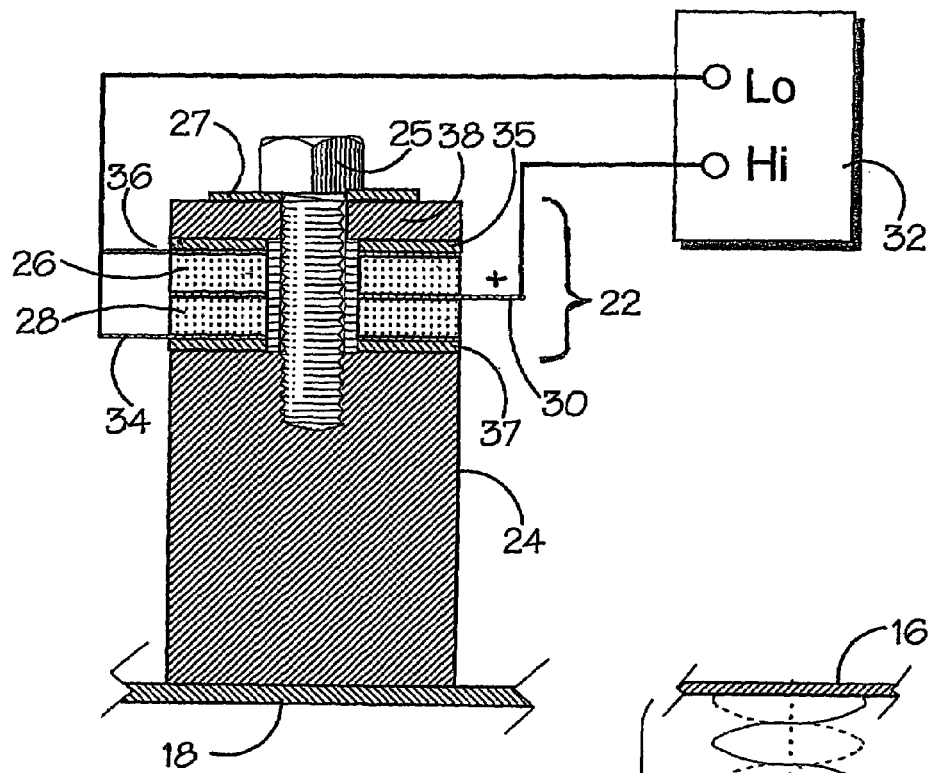
FIG. 3 is a side, sectional view of an arrangement of transducer module and wave-guide used in the processor, which assembly comprises the transducer.

The bank of transducers 22, which is comprised of transducers shown in FIG. 3, may be driven by an ultrasonic switching generator 32, which operates directly from the 50/60 Hz line or main power, with the high frequency sinusoidal drive to the transducer being developed by the output inductance of the generator in electrical resonance with the capacitance of the piezoelectric elements 26/28.The operating frequency of the system may be the mechanical resonant frequency of the waveguide 24.

Figure 4:
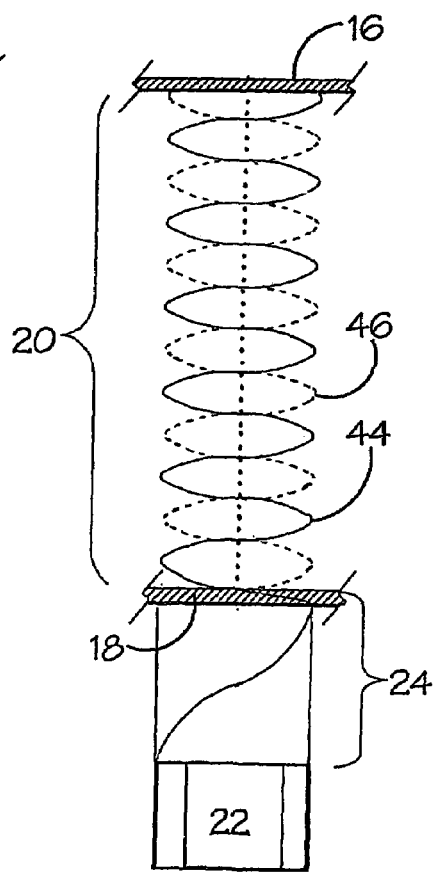
FIG. 4 illustrates the standing wave in the processor.

FIG. 4, illustrates his combination for representational purposes. Alumna ceramic washers 35/37 provide electrical isolation from the 50/60 Hz line.

In practice, the transducer will be driven at its natal resonant frequency, in which case the operating frequency is determined by the overall length of the transducer, including wave-guide 24 and the transducer module 22.

In the arrangement illustrated in FIG. 3, each transducer module 22 is bolted to a respective wave-guide 24, with washer 37 being interposed there between the contacting faces of the transducer module and wave-guide. The washer and the wave-guide being flat and compressed together by the bolt 25 in order that ultrasonic waves can be efficiently passed from the transducer module 22 to the wave-guide 24.

Each wave-guide is attached, in the illustrated embodiment, by brazing, to the outer face of the lower end wall 18. Hence, ultrasonic vibrations in the wave-guide can be transmitted to the lower end wall 18, and through the wall, to the contents of the processor. The metal wave-guide brazed to the end wall 18 provides a robust mounting for the transducer module 22. The transducer module itself, being simply bolted to the wave-guide, is straightforwardly removable for replacement.

The length of the currently preferred transducer is half a wavelength of sound at the processor's operating frequency, which in the compression mode effectively transmits ultrasonic energy to the liquid load. The wave-guide section of the transducer can be of titanium braised to wall 18 for high power density applications, or of aluminum chemically bonded for low or medium power density.

The transducer module 22 is of piezoelectric type in the illustrated embodiment: between the piezoelectric elements 26,28 is sandwiched a first electrode 30 connected to the high side of the oscillator circuit 32. Second electrodes 34,36 are provided in the outer surface s of the respective piezoelectric elements and connected to the low side of the oscillator circuit. The well-known effect of the oscillating electric fields produced by means of the electrodes is to cause a periodic change in the length of the piezoelectric elements. Due to inertia, contributed mainly by a back plate or mass 38, the transducer module consequently causes the transducer FIG. 3 to vibrate. The bank of transducers 22 is driven in phase. The back mass 38 is at the transducer arrangement's outermost end, the head of the bolt 25 bearing upon the back mass through a compression washer 27.

Electrical isolation for the transducer is provided by means of isolating washers 35,37. In the illustrated embodiment, these isolating washers are formed as alumina rings. An upper one of the washers 35 is interposed between the uppermost electrode 36 and the back mass; the lower washer 37 is interposed between the lowermost electrode 34 and the wave-guide 24. The bolt 25 is also provided with an insulating sleeve (illustrated in the diagram). With this configuration, it is also possible to dispense with the isolating transformers in the electrical supply, a significant source of heat. This is especially important when constructing a fully enclosed processor, as required in the oil industry, where heat output must be minimised in order to achieve an acceptable operating temperature, and Zone 1 certification.

The isolating washers 35,37 sandwich, and are chemically bonded with epoxy resin to the low, or negative electrodes 34,36. Similarly, the high or positive sides of the elements are mutually bonded to the electrode 30. A phosphor bronze mesh, embedded in the resin at each contacting surface, ensures proper glue line and maximum strength of the assembly, and in this way a robust transducer module is constructed.

The material (in this case alumina oxide) of the isolating washers 35,37 is chosen to give enhanced wave transmission. Alumina oxide has an acoustic velocity significantly higher than that of aluminium or titanium, and so provides efficient acoustic coupling.

The result is a highly efficient transducer producing little waste heat. In the illustrated embodiment, the transducer is driven at between 20 and 80 kHz, and more typically 20 and 40 kHz. In the practical case, the diameter of alumna washers is greater than that of the waveguide. The washers are not only lapped to a very fine finish but also protect the surface of the waveguide from damage, which could happen in case of piezoelectric element failure resulting in arcing to the metal surface. This is important because the metallically bonded waveguides cannot easily be removed and replaced.

Turning back to FIG. 1, throughput of material is provided for by means of an input pipe 40 close to the bottom of the processor chamber 12 and an output pipe 42 close to its top, both communicating with the interior 20 of the chamber. While the input 40 and output 42 are both radially directed, and are laterally separated, it will be apparent that they are also separated along a sidewall 14 in direction perpendicular to the wall 18 (i.e. parallel to the chamber's axis, in this current embodiment). The direction of the flow of material in the chamber 12 must have an axial component—i.e. the material must move along a direction from the bottom of the chamber to the top as indicated by arrow 43—although there must be a radial component in the flow direction, and clearly the velocity and precise direction of the flow must vary from one point to another within the chamber. The speed of this flow is low (in comparison with prior art ultrasonic tubular processors) due to the large cross section of the processor chamber 12, which has a diameter of approximately 36 cm. Residence time of the material in the processor chamber is correspondingly long (25 seconds is not untypical).

FIG. 4 illustrates in highly schematic form the behaviour of ultrasonic waves in the processor chamber 12. The transducer module 22, wave-guide 24, and end walls 16,18 are all labelled as in earlier drawings. The drawing 44 shows a wave outgoing from the wall 18 as a solid line and a wave 46 which has been reflected from the upper wall 16 as a dotted line. As the skilled person will readily appreciate, the superposition of the outgoing and reflected waves 44,46 can, if the wavelength is appropriately chosen with respect to the path length of the waves, be a sonic standing wave. The currently preferred embodiment uses a frequency in the region of 20 kHz to produce a standing wave pattern having 6 wavelengths in the processor chamber.

Because the direction of the flow of material through the processor chamber has a component which is along the direction of propagation of the outgoing and reflected waves 44,46, the material flowing through the processor must pass through alternate zones of compression and rarefaction of the standing wave pattern. This progression through the chamber 12 in the direction 43 ensures that the material is ultrasonically processed by cavitation action in each of several rarefaction zones therein.

Additionally, large particles in the material being processed are believed to tend to remain, due to their large mass, at the lower end of the processor chamber until broken down by the action of the ultrasound, thereby increasing residence time of these particles and so improving particle size reduction.

Certain prior art processors intended for processing large liquid loads employ individual high-intensity transducers as probes, the heads of which project into a chamber to activate the liquid mix contained therein. The transducers themselves are secured to the chamber wall by nodal flanges, and are thus acoustically isolated from the chamber wall itself (e.g. WO 00/54095; J59087026).

This type of ultrasonic processor, in which probe transducers are used to activate liquid in a vessel, is considered inefficient. Thermal and acoustic coupling of probes to the volume of liquid in a chamber is poor, with consequent thermal problems.

Another prior art unit (WO 01/17672) intended for processing drill cuttings is similar to the above referenced tubular processor. The ultrasonic wave is applied perpendicular to the flow of slurry in the processor. This unit features an inner cylinder, which in conjunction with the outer wall forms a narrow, annular processing chamber. This tubular processor uses low intensity (non resonant) transducers, widely spaced, thus, providing low power density in the outer tube (driven) wall. Acoustic losses in this wall made of stainless steel, and the inner chamber, with its helical steel ribbon, may be expected to be high.

This tubular processor (though avoiding possible disruption of the ultrasonic field by laminar flow in the wide diameter inner tube) also appears to be inefficient in using the ultrasonic energy supplied by the transducers.

The liquid capacity of the above tubular processors is about 12 liters. For a typical drill cuttings application, with liquid capacity flow rate of 2 liters per second (1 barrel per minute), the processors may be said to have a residence time of about 6 seconds. Four such processors connected in series may be needed to provide adequate ultrasonic processing time. But such an arrangement, especially if the processors are connected in serpentine formation, may have the disadvantage, when drilling stops, of sedimentation blocking the lower coupling pipes.

In accordance with the present invention, the processor chamber will be about 50 cm deep and have a liquid capacity of 50 liters. Since there is no fundamental limitation on the dimensions of the chamber in cross section, processors can be custom built to specification.

Also, if necessary, the processors of the current invention can be connected in series with the advantage that sediment deposited on the surface of a wall to which transducers are attached, is likely to be cleared automatically by ultrasonic action when the processor is switched on.

Figure 5:
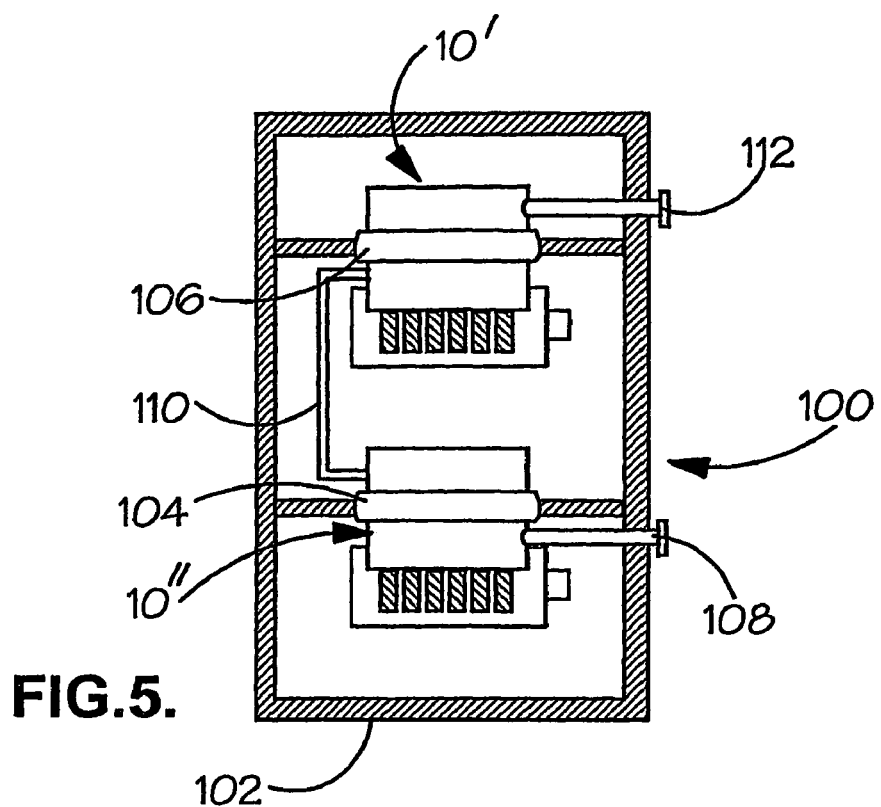
FIG. 5 is a view from one side of a drill cuttings processing system utilizing two processors of the type illustrated in FIGS. 1 to 4.

The processor 10 can be utilized in a processing system such as the arrangement 100 illustrated in FIG. 5. In fact, this system has two such processors mounted and, for safety purposes, enclosed one above the other in a frame 102 by means of respective acoustic isolation clamps 104,106. The system has an input 108 to the lowermost processor 10" whose output is led via a transfer conduit 110 to the uppermost processor 10' and through this to the system output 112.

The input 108, output 112 and transfer conduit 110 are each formed as pipes of substantially 5 cm diameter.

Series connection of the two processors increases the time for which the material is exposed to ultrasound and hence the effectiveness of the system in reducing particle size.

Drive circuits suitable for driving the transducers are known to the skilled person and are not described herein, but reference is directed in this connection to the inventor's own. Patents U.S. Pat. Nos. 4,588,917, 4,554,477, and GB 2151435. These patents describes circuits having "frequency sweep" (periodic variation of drive frequency) and "auto-follow" (automatic adjustment of drive frequency) and either or both of these features may be used in the present invention.

The processor of the current invention is expected to have a drill cuttings throughput rate of the order of 2 tonne per kW hour and electrical to acoustic energy-conversion efficiency close to 95%.

Figure 6:
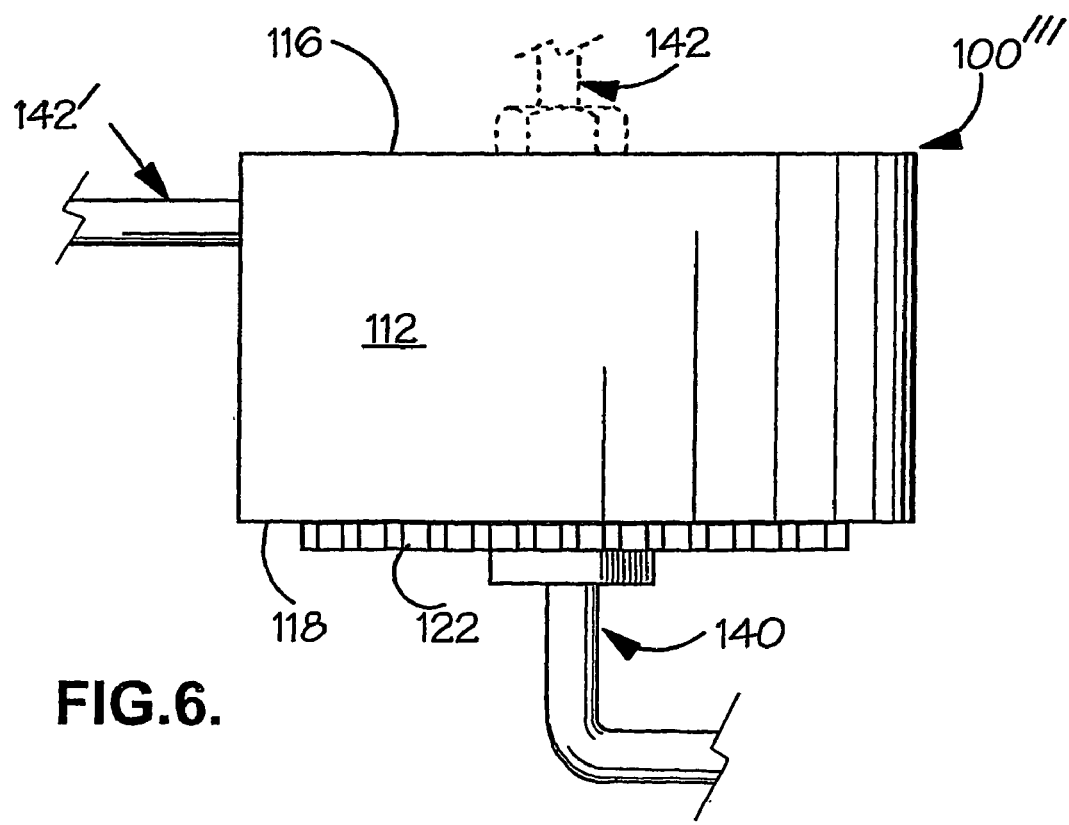
FIG. 6 is a view from the side of an alternative construction of a processor according to the present invention.

FIG. 6 illustrates alternative configurations of input and output for the processor chamber. The illustrated ultrasonic processor 100''' has a lower end wall 118 upon which are mounted the transducers 122. The processor chamber 112 is again cylindrical, lower end wall 118 and upper wall 116 being circular. Input 140 is in his embodiment axially (i.e. upwardly) direct passing through the end wall 118. The output may likewise be axial, passing through the upper end wall as indicated in the phantom at 142. It may alternatively be radial taken through the chamber's sidewall as indicated at 142'.

While the illustrated embodiments use processor chambers of circular section other shapes, including rectangular section, may be used.

The invention claimed is:

1. An ultrasonic processor for the separation of a liquid mixture, the processor comprising an enclosed processor chamber having opposite end walls and input and output mixture carrying ports communicating with the process chamber for the throughput of the mixture to be processed and a bank of ultrasonic converter units coupled to a wall of the processor chamber for transmitting ultrasonic waves to the mixture in the processor chamber characterised in that the input port is displaced from the output port along a connecting wall of the chamber in a direction substantially perpendicular to the chamber wall to which the bank of ultrasonic converter units are coupled, and the converter units in operation create an ultrasound stable standing wave pattern of multiple wavelengths between the input and the output ports of the ultrasonic processor and along the length of the processor chamber.

2. An ultrasonic processor according to claim 1 and in which the displacement of the input port from the output port along the length of the processor chamber is greater than a wavelength of ultrasound created by ultrasonic transducers in the converter units.

3. An ultrasonic processor according to claim 1 in which the input port is at the bottom of the process chamber and the output port is at the top of the chamber.

4. An ultrasonic processor according to claim 1 wherein the wall upon which the ultrasonic converter bank is mounted is at least substantially flat.

5. An ultrasonic processor according to claim 1 wherein the length of the individual converter units is at least substantially half a wavelength of ultrasound at the driven frequency of the converter units.

6. An ultrasonic processor according to claim 1 wherein the converter units are driven in phase with each other.

7. An ultrasonic processor according to claim 1 wherein the chamber wall is mounted to the chamber enclosure by an acoustic isolation means.

8. An ultrasonic processor according to claim 1 wherein the length of each individual converter unit of the bank of converter units mounted to the chamber wall, is substantially a quarter of a wavelength of ultrasound therein at a driven frequency of an ultrasonic transducer in the converter units.

9. An ultrasonic drill cuttings treatment system comprising at least one ultrasonic processor according to claim 1.

10. An ultrasonic processor according to claim 1 in which the chamber comprises a sealed metal container having substantially parallel enclosing walls, the ultrasonic converter units being coupled to the wall.

11. An ultrasonic processor according to claim 10 and in which the parallel walls are separated by a distance which is an integral or half integral multiple of wavelength of the ultrasound standing wave.

12. An ultrasonic processor according to claim 11 in which the processor chamber is of tubular construction.

13. An ultrasonic processor according to claim 11 in which the processor chamber is non-cylindrical.

14. An ultrasonic processor according to claim 1 wherein the individual converters units of the bank of converters are comprised of: a back plate, a transducer module and a wave-guide; the parts so assembled being compressed at predetermined torque by a compression bolt passed through the back plate and transducer module and screwed into one end of the wave-guide, the other end being metallically or chemically bonded to the processor chamber wall.

15. An ultrasonic processor according to claim 14 in which the back plate is stainless steel, titanium or aluminium.

16. An ultrasonic processor according to claim 14 in which the wave-guide has the same cross sectional area along its length as the transducer module to which it is connected.

17. An ultrasonic processor according to claim 14 in which the wave-guide increases in width along its length to have substantially greater cross section at the wall than the transducer module to which it is connected and thus transform power density at the face of the module to a lower density over a greater area.

18. An ultrasonic processor according to claim 14 is conical, pyramidical or other configuration invert of welding-transducer horn design.

19. An ultrasonic processor according to claim 14 in which a bank of wave-guides of pyramidical form truncated to accept ultrasonic energy from the transducer modules, is bonded to the chamber wall with edges of respective wave-guides within 5 cm or less of each other on the chamber wall.

* * * * *